US010691149B2

(12) United States Patent
Buffenbarger (10) Patent No.: US 10,691,149 B2
(45) Date of Patent: Jun. 23, 2020

(54) CONTROLLER AND METHOD FOR OPERATING A POWER DISTRIBUTION SYSTEM

(71) Applicant: GE AVIATION SYSTEMS LLC, Grand Rapids, MI (US)

(72) Inventor: Ryan Lee Buffenbarger, New Carlisle, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 15/703,361

(22) Filed: Sep. 13, 2017

(65) Prior Publication Data

US 2019/0079548 A1 Mar. 14, 2019

(51) Int. Cl.
| | | |
|---|---|---|
| G05F 1/46 | (2006.01) |
| H02J 3/38 | (2006.01) |
| H02J 3/46 | (2006.01) |
| H02J 13/00 | (2006.01) |
| B64D 41/00 | (2006.01) |
| H02J 4/00 | (2006.01) |
| H02J 1/10 | (2006.01) |

(52) U.S. Cl.
CPC ............... *G05F 1/46* (2013.01); *B64D 41/00* (2013.01); *H02J 3/381* (2013.01); *H02J 3/46* (2013.01); *H02J 13/0003* (2013.01); *H02J 13/0062* (2013.01); *H02J 1/102* (2013.01); *H02J 3/38* (2013.01); *H02J 4/00* (2013.01)

(58) Field of Classification Search
None
See application file for complete search history.

(56) References Cited

U.S. PATENT DOCUMENTS

| | | | |
|---|---|---|---|
| 8,645,726 B2 | 2/2014 | Lee et al. | |
| 8,676,393 B1 | 3/2014 | Hupton et al. | |
| 8,772,954 B1 | 7/2014 | Barngrover | |
| 9,214,809 B2 | 12/2015 | Buterbaugh et al. | |
| 9,257,838 B2 | 2/2016 | Gataric et al. | |
| 9,260,976 B2 | 2/2016 | Phillips et al. | |
| 2009/0295551 A1* | 12/2009 | Dickey | H02J 3/00 340/568.2 |
| 2015/0365002 A1 | 12/2015 | Cao et al. | |
| 2016/0094036 A1* | 3/2016 | Alfermann | H01J 13/00 307/44 |
| 2016/0285269 A1 | 9/2016 | Majumder | |
| 2017/0271872 A1* | 9/2017 | Ravikumar | H02J 3/381 |

FOREIGN PATENT DOCUMENTS

WO 2016029944 A1 3/2016

\* cited by examiner

*Primary Examiner* — Ryan A Jarrett
(74) *Attorney, Agent, or Firm* — McGarry Bair PC (57) ABSTRACT

A power controller adapted for operating a set of power sources includes a power characteristic input and a communications connection and a controller module. The controller module is adapted for obtaining a power characteristic at the power characteristic input, the power characteristic related to a quantity of power supplied from an associated power source to a common power bus, for obtaining at least one power system message received at the communications connection, and for determining a present share of desired power to be supplied from the associated power source.

20 Claims, 3 Drawing Sheets

CONTROLLER AND METHOD FOR OPERATING A POWER DISTRIBUTION SYSTEM

BACKGROUND OF THE INVENTION

Electrical power distribution systems manage the allocation of power from energy sources to electrical loads that consume distributed electrical power. In aircraft, gas turbine engines for propulsion of the aircraft typically provide mechanical energy that ultimately powers a number of different accessories such as generators, starter/generators, permanent magnet alternators (PMA), fuel pumps, and hydraulic pumps, e.g., equipment for functions needed on an aircraft other than propulsion. For example, contemporary aircraft need electrical power for electrical loads related to avionics, motors, and other electric equipment.

BRIEF DESCRIPTION OF THE INVENTION

In one aspect, the present disclosure relates to a power controller, including a power characteristic input and a communications connection and a controller module. The controller module can be adapted to obtain a power characteristic at the power characteristic input, the power characteristic related to a quantity of power supplied from an associated power source to a common power bus. The controller module can also be adapted to obtain at least one power system message received at the communications connection, the at least one power system message originating from another power controller supplying power to the common power bus. The controller module can also be adapted to determine a present share of desired power to be supplied from the associated power source to the common power bus based on the obtained power characteristic and the obtained at least one power system message, and to operate the associated power source in accordance with the determined present share of desired power.

In another aspect, the present disclosure relates to a method of allocating power in a power distribution system, including broadcasting, by a first power controller associated with a first power source, a generated message on a common communications bus indicative of the power capabilities of the first power source; obtaining, by a second power controller associated with a second power source, the generated message; determining, by the second power controller, a present share of desired power to be supplied from the second power source based on the obtained generated message and the power capabilities of the second power source; and operating the second power source in accordance with the determined present share of desired power to be supplied from the second power source to a common power bus connected with the first and second power source outputs.

In yet another aspect, the present disclosure relates to a power distribution system, including a set of power sources arranged electrically in parallel to a common power bus, a common communications bus, and a set of power controllers respectively associated with the set of power sources. Each of the set of power controllers can include a power characteristic input and a communications connection to the common communications bus and a controller module. The controller module is adapted to obtain a power characteristic at the power characteristic input, the power characteristic related to a capacity of available power of the associated power source, to obtain at least one power system message received at the communications connection from another controller module, to determine a present share of desired power to be supplied from the associated power source to the common power bus based on the obtained power characteristic and the obtained at least one power system message, and to operate the associated power source in accordance with the determined present share of desired power.

DESCRIPTION OF EMBODIMENTS OF THE INVENTION

The aspects of the present disclosure are described herein in the context of an aircraft, which enables production of electrical power from an energy source such as a turbine engine, jet fuel, hydrogen, etc. However, it will be understood that while one aspect of the disclosure is shown in an aircraft environment, the disclosure is not so limited and has general application to electrical power distribution systems in non-aircraft applications, such as other mobile applications and non-mobile industrial, commercial, and residential applications. For example, applicable mobile environments can include an aircraft, spacecraft, space-launch vehicle, satellite, locomotive, automobile, etc. Commercial environments can include manufacturing facilities or power generation and distribution facilities or infrastructure.

While "a set of" various elements will be described, it will be understood that "a set" can include any number of the respective elements, including only one element. The use of the terms "proximal" or "proximally" refers to moving in a direction toward another component, or a component being relatively closer to the other as compared to another reference point. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. Additionally, while terms such as "voltage", "current", and "power" can be used herein, it will be evident to one skilled in the art that these terms can be interchangeable when describing aspects of the electrical circuit, or circuit operations.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

As used herein, an "essential" electrical load can be a subset of one or more electrical loads of a power distribution system or architecture classified or categorized as "essential" or "critical" to the operation of the power architecture, vehicle, or another system. In one non-limiting aspect, an "essential" electrical load can be critical to flight operations of an aircraft or critical aircraft systems, and can be defined by relevant federal aircraft regulations or relevant industry standards.

The exemplary drawings are for purposes of illustration only and the dimensions, positions, order and relative sizes reflected in the drawings attached hereto can vary.

Figure 1:
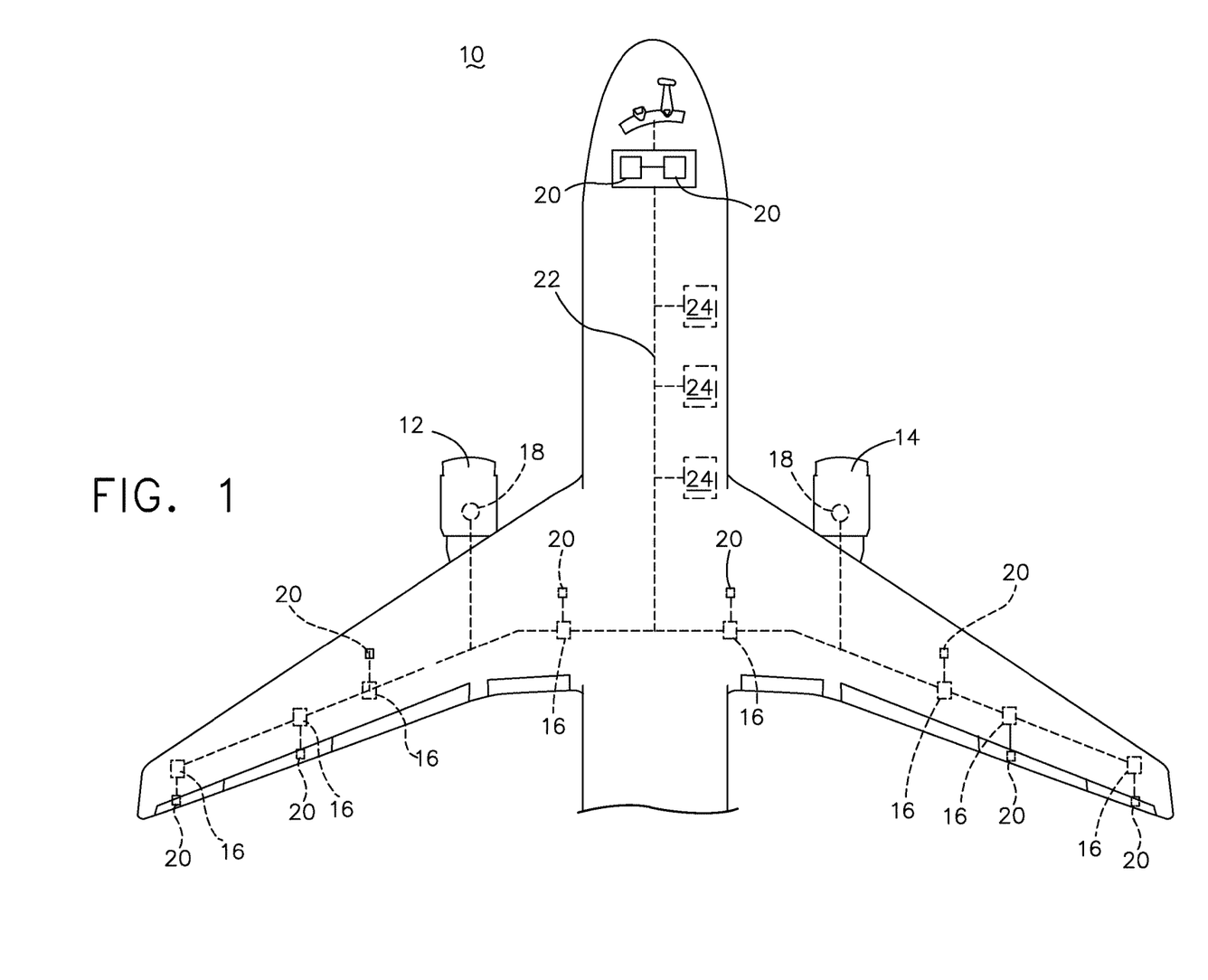
FIG. 1 is a top down schematic view of an aircraft and power distribution system of an aircraft, in accordance with various aspects described herein.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further include at least one power source, such as a first electric machine or a generator 18. The left and right engine systems 12, 14 can further include another power source, such as a second electric machine or generator (not shown). Non-limiting aspects of the disclosure can be included wherein, for example, the first generator 18 is a primary power source and the second generator is a secondary, back-up, or redundant power source. The aircraft is shown further having a set of power-consuming components, or electrical loads 20, such as for instance, an actuator load, flight critical loads, and non-flight critical loads.

The electrical loads 20 are electrically coupled with at least one of the generators 18 via a power distribution system including, for instance, power transmission lines 22 or bus bars, and power distribution nodes 16. The aircraft 10 can further include a set of supplemental power sources 24 selectably connected with the transmission lines 22, and operable to provide supplemental power, redundant power, backup power, emergency power, or the like. Non-limiting examples of the supplemental power sources 24 can include, but are not limited to, generators, such as auxiliary or emergency power generators, solar panels, fuel cells, batteries, or any other source of electrical power. As shown, the set of supplemental power sources 24 can provide power to the set of transmission lines 22, and thus, the set of power distribution nodes 16 or the set of electrical loads 20.

It will be understood that the illustrated aspects of the disclosure of FIG. 1 is only one non-limiting example of a power distribution system, and many other possible aspects and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, typically via a spool, to provide a driving force for the set of generators 18. The set of generators 18, in turn, generate power, such as AC or DC power, and provides the generated power to the transmission lines 22, which delivers the power to the electrical loads 20, positioned throughout the aircraft 10. Furthermore, during operation, the set of supplemental power sources 24 can selectably be connected with the transmission lines 22, and operable to provide supplemental power to the electrical loads 20.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. Additional management functions can be included. During emergency or inadequate periods of electrical power generation, including but not limited to engine or generator failure, at least one of the supplemental power sources 24 can be operated, enabled, or connected for providing power to the electrical loads 20. Additional management functions can be included.

It will be understood that while aspects of the disclosure are shown in an aircraft environment of FIG. 1, the disclosure is not so limited and has general application to electrical power systems in non-aircraft applications, such as other mobile applications and non-mobile industrial, commercial, and residential applications. For example, while this description is directed toward a power system architecture in an aircraft, aspects of the disclosure can be further applicable to provide power, supplemental power, emergency power, essential power, or the like, in otherwise non-emergency operations, such as takeoff, landing, or cruise flight operations.

Furthermore, the number of, and placement of, the various components depicted in FIG. 1 are also non-limiting examples of aspects associated with the disclosure. For example, while various components have been illustrated with relative position of the aircraft (e.g. the electrical loads 20 on the wings of the aircraft 10, etc.), aspects of the disclosure are not so limited, and the components are not so limited based on their schematic depictions. Additional aircraft 10 configurations are envisioned.

Figure 2:
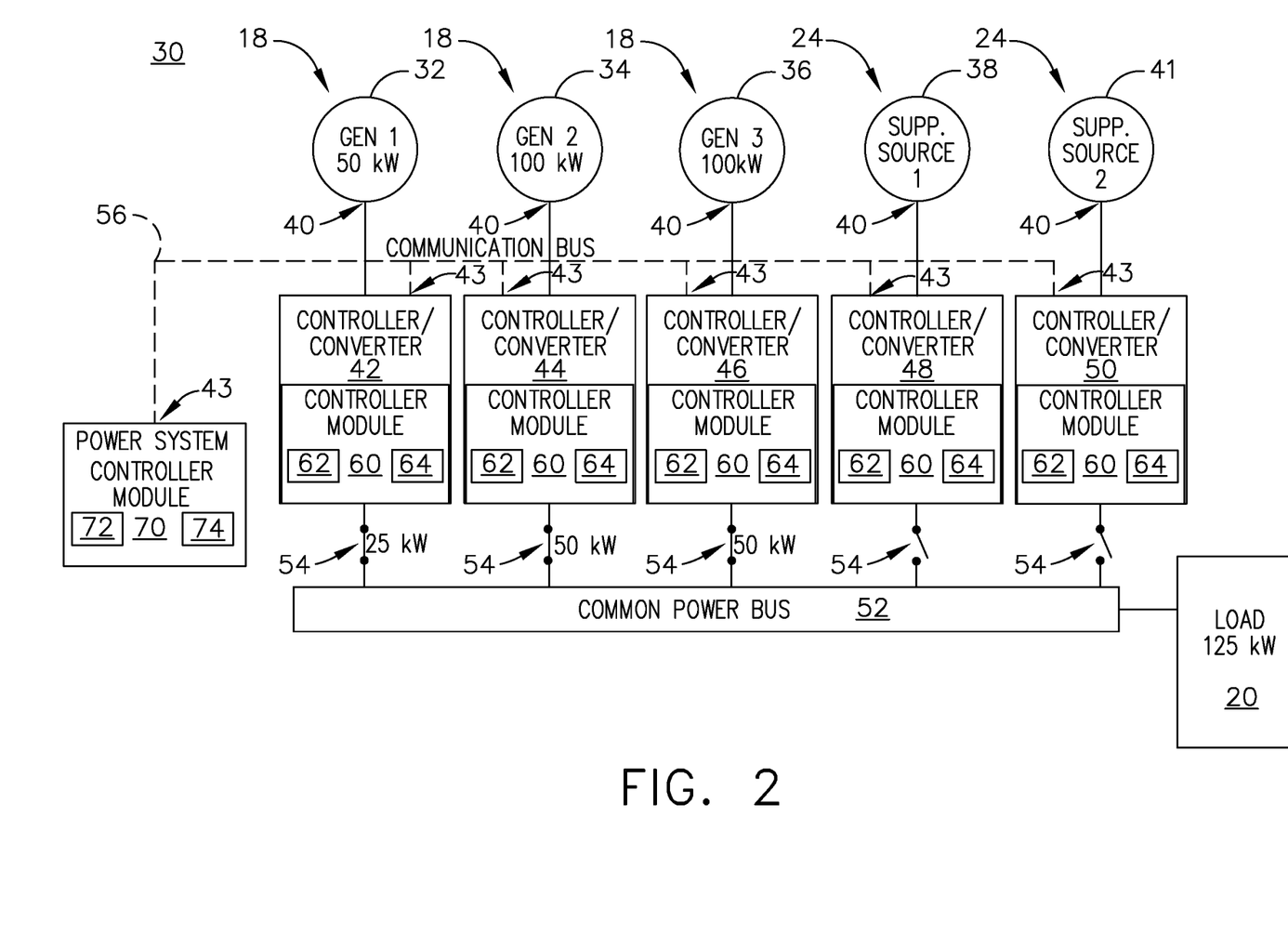
FIG. 2 is an example schematic illustration of an electrical power distribution system in accordance with various aspects described herein.

Referring now to FIG. 2, a non-limiting schematic illustration of a power distribution system 30 in accordance with various aspects described herein is shown. The power distribution system 30 is shown having a set of generators 18, including a first generator 32, a second generator 34, and a third generator 36. While three generators 32, 34, 36 are shown, aspects of the disclosure can include any number of generators 18. The power distribution system 30 is also shown including a set of supplemental power sources 24, including a first supplemental power source 38 and a second supplemental power source 41. While two supplemental power sources 38, 41 are shown, aspects of the disclosure can include any number of supplemental power sources 24. Each of the set of generators 18 and the set of supplemental power sources 24 can include a power output 40 for supplying power from the respective power source 18, 24.

While the set of generators 18 and set of supplemental power sources 24 are illustrated similarly, non-limiting aspects of the disclosure can be included wherein the respective sources 18, 24 have varying electrical supply or power characteristics, such as the amount or quantity of power generated or otherwise produced. For instance, the first generator 32 can continuously generate 50 kiloWatts (kW) of electrical power during operation, while the second and third generators 34, 36 can continuously generate 100 kW of electrical power during operation. Non-limiting examples of the set of generators 18 or the set of supplemental power sources 24 can be included wherein non-continuous power is supplied. For example, a "generator" supplying power via solar panels can be dependent on the weather or cloud cover, while a bank of batteries can have a set amount of electrical storage that can be discharged. In another non-limiting example, even traditional generators 18 can operate with different power characteristics depending on environmental conditions such as the solar cycle, temperature, variable-speed power generation, flight phase, or maintenance cycles.

Each of the power sources 18, 24, 32, 34, 36, 38, 41 can be electrically connected at their respective power outputs 40 to a power controller associated with that respective power source 18, 24, 32, 34, 36, 38, 41. As shown, a first power controller 42 can be connected with the first generator 32, a second power controller 44 can be connected with the second generator 34, a third power controller 46 can be connected with the third generator 36, a fourth power controller 48 can be connected with the first supplemental power source 38, and a fifth power controller 50 can be connected with the second supplemental power source 41. Each respective power controller 42, 44, 46, 48, 50 can further include a controller module 60 having a processor 62 and memory 64.

The set of power controllers 42, 44, 46, 48, 50 can operably regulate the respective power sources' 18, 24, 32, 34, 36, 38, 41 power supplied to the power output 40, in response to a control signal provided to the respective power source 18, 24, 32, 34, 36, 38, 41. For instance, in response to a control signal from the first power controller 42, the first generator 32 can operably regulate, modify, alter, or otherwise control at least one power characteristic of the power supplied to the power output 40. Non-limiting examples of at least one power characteristic of the power supplied can include an output voltage or an output current. The set of power controllers 42, 44, 46, 48, 50 can further be selectably connected with a common power bus 52, such as the transmission lines 22 of FIG. 1. The selectable connection can include a controllable switching element, schematically illustrated as a switch 54, capable of enabling or disabling an electrical connection between the respective power source 18, 24 and the common power bus 52. In one non-limiting example, the switch 54 can be controlled by the respectively associated power controller 42, 44, 46, 48, 50. The common power bus 52 can further be connected with a set of electrical loads, schematically represented as a single electrical load 20.

Non-limiting aspects of the disclosure can be included wherein at least a subset of the power controllers 42, 44, 46, 48, 50 can further operate as a power converter. In this sense, the power controller/converter 42, 44, 46, 48, 50 can operate or be enabled to controllably convert a first power, such as the power received by the respective power output 40, to a second power supplied to the common power bus 52. Non-limiting examples of controllably converting the first power to the second power can include step-up or step-down power conversion (e.g. a first current or voltage to a second current or voltage), direct current (DC) to alternating current (AC) power conversion or AC to DC power conversion, AC to AC power conversion, DC to DC power conversion, the like, or a combination thereof. Non-limiting aspects of the disclosure can be included wherein the power supplied to the common power bus 52 includes a similar set of power characteristics (e.g. DC voltage at a common voltage level, AC voltage at a common voltage level and common frequency, etc.), which can be enabled by the set or subset of the power controller/converters 42, 44, 46, 48, 50. While "power controller" is primarily used herein, it will be understood that any "power controller" can include a "power controller/converter" unless otherwise noted.

The set of power controllers 42, 44, 46, 48, 50 can be communicatively interconnected by way of a common communications bus 56 connected with each respective power controller 42, 44, 46, 48, 50 at a communications connection 43. The common communications bus 56 can further be communicatively interconnected with an optional power system controller module 70, remote from the power distribution system 30, and having a processor 72 and memory 74. Non-limiting aspects of the disclosure can include a broadcast-style common communications bus 56, wherein the set of power controllers 42, 44, 46, 48, 50 and the optional power system controller module 70 can each independently broadcast a communications message from the communications connection 43, onto the communications bus 56, that is received by the other power controller 42, 44, 46, 48, 50 and the optional power system controller module 70, or their respective communications connections 43. In this sense, the communication connection 43 can be a bidirectional connection 43, or the respective communication connections 43 can include a broadcast output and a broadcast input.

Aspects of the disclosure described herein allow for, or otherwise enable a power distribution system 30 capable of self-allocation of power supplied from the set of power sources 18, 24 to the common power bus 52 and the set of electrical loads 20. As shown, the parallel-configured power sources 18, 24, including power sources 18, 24 having different electrical ratings of power characteristics, can be enabled to supply power, by way of the respective power controller or controller/converter 42, 44, 46, 48, 50, to the common power bus 52 for increased total available power, system robustness, redundancy, or the like.

In the instance illustrated, the respective switches 54 associated with the first generator 32, the second generator 34, and third generator 36 are closed, enabling the supplying of power from the respective generators 32, 34, 36 to the common power bus 52. In contrast, the respective switches 54 associated with the first supplemental power source 38 and the second supplemental power source 41 are opened, disabling the supplying of power from the respective supplemental power sources 38, 41 to the common power bus 52.

During operation, the power controller 42, 44, 46, 48, 50, for each respective power source 18, 24, 32, 34, 36, 38, 41 can obtain a set of broadcasted messages from the other subset of power sources 18, 24, 32, 34, 36, 38, 41. Additionally, each power controller 42, 44, 46, 48, 50, for each respective power source 18, 24, 32, 34, 36, 38, 41 can, in turn, generate and broadcast a message of its own. In one non-limiting example, the power sources 18, 24, 32, 34, 36, 38, 41 can only obtain a set of broadcasted messages from the other subset of power sources 18, 24, 32, 34, 36, 38, 41 supplying power to the common power bus 52 (e.g. not the first or second supplemental power sources 38, 41, as illustrated). The broadcasted messages can be generated or received at the respective communications connection 43 of the power controller 42, 44, 46, 48, 50.

Non-limiting examples of the broadcast message can include a set of data related to the respective power source 18, 24, 32, 34, 36, 38, 41. For example, each respective power controller 42, 44, 46, 48, 50 can generate a message including at least a subset of an identifier for identifying the message generating power controller 42, 44, 46, 48, 50 (or respective power source 18, 24, 32, 34, 36, 38, 41), the respective power source 18, 24, 32, 34, 36, 38, 41 capabilities, or a combination thereof. In one non-limiting example, the power source 18, 24, 32, 34, 36, 38, 41 capabilities can include, but is not limited to, one or more power characteristics of the power source 18, 24, 32, 34, 36, 38, 41. The power characteristics of the power source can further include, but are not limited to, the amount of available power supply or capacity that can be provided by the respective power source 18, 24, 32, 34, 36, 38, 41, the present amount of power, current, or available capacity being supplied to the common power bus 52, the like, or a combination thereof. In another non-limiting aspect, the power characteristic can be received, calculated, determined, or sensed at an input at or within the respective power controller 42, 44, 46, 48, 50 or power source 18, 24, 32, 34, 36, 38, 41. The respective power source 18, 24, 32, 34, 36, 38, 41 capabilities, characteristics, capacity, or the like, can be obtained by the respective power controller 42, 44, 46, 48, 50 by way of sensors or measuring capabilities, the respective power output 40, predetermined configuration, or the like.

In another non-limiting aspect of the disclosure, the generated message can include an operating status indicator, indicative of the current operational status of the respective power source 18, 24, 32, 34, 36, 38, 41. Operational statuses can include, but are not limited to, indicators representative of currently supplying power to the common power bus 52, not currently supplying power to the common power bus 52, available capacity of power suppliable to the common power bus 52, an operational delay time period that it would take to begin supplying power to the common power bus 52, or the like.

When each of the power sources 18, 24, 32, 34, 36, 38, 41 generates the respective generated messages, and broadcasts the message on the common communication bus 56, a receiving power controller, for example, the first power controller 42, can determine its own respective allocation of or contribution to the total power distribution system 30 power output, without the use of a centralized controller, master-style commands or instructions, or explicit negotiation or coordination with other power sources 18, 24, 32, 34, 36, 38, 41.

For example, if it is known or understood by the first power controller 42 that the total power demand for the set of electrical loads 20 or power-consuming elements connected with the common power bus 52 is 125 kW (as shown in the electrical load 20 of FIG. 2), and the first power controller 42 receives the broadcasted messages from the second power controller 44 and the third power controller 46, the first power controller 42 can determine its own respective contribution to the total power distribution system 30 power output to the common power bus 52. In this example, the first power controller 42 understands its own power characteristic, that is, that it can generate 50 kW of continuous power from the first generator 32, and the received or obtained broadcast message from the second power controller 44 would indicate the power characteristic that the second generator 34 can generate 100 kW of continuous power, and the received or obtained broadcast message from the third power controller 46 would indicate the power characteristic that the third generator 36 can generate 100 kW of continuous power, the first power controller 42 can make some determinations.

A first determination can include determining a present share or ratio of the desired or demanded power for the power distribution system 30. The present share or ratio can be calculated by dividing the power characteristic of the associated power source (the first generator 32, 50 kW) with the total power capacity or capabilities of the power sources supplying power to the common power bus 52 (the first, second, and third generators 32, 34, 36; 50 kW plus 100 kW plus 100 kW, or 250 kW of total power capacity). In the illustrated example, the determined present share or ratio of the desired or demanded power for the power distribution system 30 from the first generator 32 and the first power controller 42 can be 0.2 or 20%. A second determination can determine or calculate a total current desired for the demanded power of the power distribution system 30. In one non-limiting example, wherein the demanded power is 125 kW, and wherein, for example, the common power bus 52 is a DC power bus operating at 270 volts DC, the total current desired for the electrical load 20 is 125 kW divided by 270 volts DC, or approximately 463 amps DC. Multiplying the first determination (20% ratio of total demanded power supplied by the first generator 32) by the second determination (463 amps is the total current desired for demanded power) results the in the respective contribution to the total power distribution system 30 power output to the common power bus 52, by the first generator 32 and the first power controller 42 of approximately 92.6 amps DC.

Once the first power controller 42 knows, understands, computes, or has otherwise determined the contribution needed or requested, the first power controller 42 can regulate the first generator 32 to provide the same at the power output 40 to the common power bus 52, as explained herein. In this sense, the associated power source (e.g. the first generator 32) can be operated, adapted, or regulated by the respective power controller (e.g. the first power controller 42) to operate in accordance with the determined respective contribution or present share of desired power. In the above-described example, the amount of power supplied by the first generator 32 and the first power controller 42 is 92.6 amps DC at 270 Volts, or 25 kW of power (as shown at the closed switch 54).

Similar calculations can be determined, computed, or the like, at the second generator 34 and second power controller 44, and at the third generator 36 and third power controller 46, respectively.

In another non-limiting example of the disclosure, each respective power controller 42, 44, 46, 48, 50 can calculate the amount whether the summation of the power being presently supplied by the set of power sources 18, 24, 32, 34, 36, 38, 41 connected with the common power bus 52 is sufficient to meet the present power demand. For instance, if the power demand increases due to additional loads being energized or powered up, or if a power source 18, 24, 32, 34, 36, 38, 41 fails or is disconnected from the common power bus 52, at least a subset of the power controllers 42, 44, 46, 48, 50 can determine or otherwise acknowledge the power deficiency of the power distribution system 30.

In one non-limiting example, the fourth power controller 48 can determine the power deficiency, and selectively operate the first supplemental power source 38 to supply a quantity of power to the common power bus 52 (e.g. by selectably connecting or closing the respective switch 54), in accordance with determining its own respective contribution to the total power distribution system 30 power output, as explained above. If the first supplemental power source 38 can satisfy the deficiency, then the power distribution system 30 operates as expected. In another example, if the first supplemental power source 38 cannot satisfy the deficiency, the power distribution system 30 can operate the second supplemental power source 40 via the fifth power controller 50 and switch 54, or a combination of the first and second supplement power sources 38, 41 (and related components) to satisfy the deficiency. Similarly, during instances of excess power supply, aspects of the disclosure can be utilized wherein, for example, a supplementary power source 24 determines or otherwise acknowledges a power surplus during operations, and in response, selectively stops supplying supplemental power to the common power bus 52.

It will be understood that any number of generators 18 or supplemental power sources 24 can be included in aspects of the disclosure to meet the power demand of the electrical loads 20 during normal operations. Additionally or alternatively, during different operational phases (e.g. climb, decent, emergency operations), a combination of generators 18 or supplemental power sources 24 can be included in aspects of the disclosure to meet the power demand of the electrical loads 20. Non-limiting aspects can be included wherein, for example, certain power sources are prioritized over others 18, 24, 32, 34, 36, 38, 41 during operations (e.g. continuous power generators 18 preferred over dischargeable battery banks). This prioritization can be indicated or stored in the respective set of power controllers 42, 44, 46, 48, 50 or the power system controller module 70.

Further example aspects of the disclosure can be included wherein additional factors or considerations are provided to the set of power controllers 42, 44, 46, 48, 50 which can affect the aforementioned determinations. For example the power system controller module 70 can generate one or more messages related to the additional factors or considerations, including but not limited to, environmental conditions such as the solar cycle, temperature, variable-speed power generation, flight phase, or maintenance cycles, which may otherwise affect power source 18, 24, 32, 34, 36, 38, 41 output. In another non-limiting example, the set of power controllers 42, 44, 46, 48, 50 can receive the demanded power of the common power bus 52 or the set of electrical loads 20 from any communicatively connected components, such as the power system controller module 70. In yet another example aspect of the disclosure, the optional power system controller module 70 can operate as a backup commanding or controlling system to controllably operate the set of power sources 18, 24, 32, 34, 36, 38, 41 or the set of power controllers 42, 44, 46, 48, 50 in the event of failure of the above-described aspects of the power distribution system 30.

Figure 3:
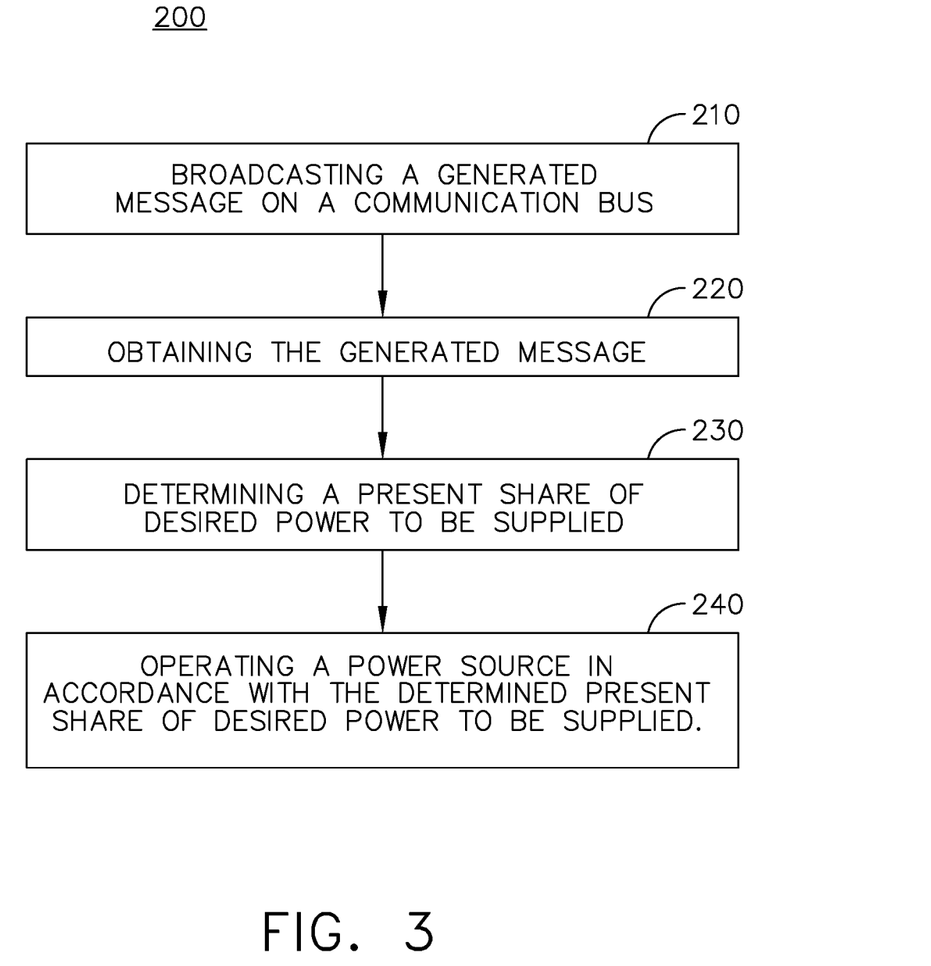
FIG. 3 is a flowchart illustrating a method of operating the electrical power system of FIG. 2, in accordance with various aspects described herein.

FIG. 5 illustrates a flow chart demonstrating a method 200 of allocating power in a power distribution system 30. The method 200 begins by broadcasting, by a first power controller 42 associated with a first power source, such as the first generator 32, a generated message on a common communications bus 56 indicative of the power capabilities of the first power source, at 210. Next, the method 200 includes obtaining, by a second power controller 44 associated with a second power source, such as the second generator 34, the generated message, at 220. The method 200 continues to determine, by the second power controller 44, a present share of desired power to be supplied from the second power source based on the obtained generated message and the power capabilities of the second power source, as explained herein, at 230. Finally, the method 200 operates the second power source accordance with the determined present share of desired power to be supplied from the second power source to the common power bus 52 connected with the first and second power source outputs 40, at 240. While the above-described method 200 only mentions a first and second controller 42, 44, and a first and second power source, the method is equally applicable for any number of associated power controllers 42, 44, 46, 48, 60 and power sources 18, 24, 32, 34, 36, 38, 41.

In one non-limiting example, the method 200 includes independently broadcasting by a set of power controllers 42, 44, 46, 48, 60 associated with a respective set of power sources 18, 24, 32, 34, 36, 38, 41, a set of generated messages on the common communications bus 56 indicative of the respective power capabilities of the respective set of power sources 18, 24, 32, 34, 36, 38, 41. In another non-limiting example, the method 200 includes obtaining, the set of independently broadcasted messages, by the second power controller 42 and determining, by the second power controller 42, a present share of desired power to be supplied from the second power source based on the obtained set of independently broadcasted messages and the power capabilities of the second power source. In yet another non-limiting example, the method 200 includes determining a present share of desired power to be supplied including calculating a desired current to be supplied equal to a ratio of the second power source to the total power capabilities of the set of power sources 18, 24, 32, 34, 36, 38, 41 multiplied by the total current demanded by the common power bus 52.

Yet another non-limiting example of the method 200 further includes obtaining, by another power controller (e.g. the fourth or fifth power controller 48, 50) associated with a third power source, such as a supplemental power source 24, 38, 41, not supplying power to the common power bus 52, the set of independently generated messages on the common communications bus 56, and determining whether the set of power sources 18, 24, 32, 34, 36, 38, 41 can meet a power demand for the power distribution system 30. In the aforementioned example, upon determining the set of power sources 18, 24, 32, 34, 36, 38, 41 cannot meet the power demand, determining, by another power controller 48. 50, a present share of desired power to be supplied from the supplemental power source 24, 38, 41 based on the obtained generated message and the power capabilities of the supplemental power source 24, 38, 41, and operating the supplemental power source 24, 38, 41 in accordance with the determined present share of desired power to be supplied from the supplemental power source 24, 38, 41 source to the common power bus 52.

In yet another non-limiting example, the method 200 includes determining a present share of desired power to be supplied by at least one of the first, second, or third power sources to the common power bus 52 is based on a prioritization of the set of power sources 18, 24, 32, 34, 36, 38, 41.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. For example, one non-limiting aspect of the above-mentioned disclosure can be adapted such that the power distribution system 30, the common communications bus 56, or the respective set of power controllers 42, 44, 46, 48, 50 are configured or adapted to prevent message collisions between the generated power system messages described herein.

The aspects disclosed herein provides a set of power controllers and method of operating and power distribution system. The technical effect is that the above described aspects enable each power source in a parallel-connected system to determine its own allocation or contribution to the total system output power without the use of a central controller and without negotiating or coordinating with other power sources. A non-limiting advantage of the above-described aspects enables improved or optimized power distribution from a number of power sources over a period of time without a centralized commanding controller. It is often desirable to distribute power between multiple parallel power sources in electrical power systems. Aspects described herein improves power availability through redundancy and can allow optimization of energy sources. For example, grid energy sources can be optimized, as in drawing more power from photovoltaic cells during daylight hours and shifting to fossil fuels, fuel cells, battery banks, or the like, at night to decrease emissions while power usage can be lower or less. In another non-limiting example environment, an aircraft with power extraction from two stages of an engine can optimize power supply by extracting more power from one stage during ascent and more power from the other stage during descent.

Power allocation between multiple parallel power sources can be controlled and commanded centrally. In a high-reliability application like an aircraft, having a central controller can be costly since all the generators are dependent on it operating and commanding correctly. It can also be a very complex design because of the processing capabilities necessary for determining power allocation for each power source. By eliminating the need for a central controller, cost savings can be achieved. Yet another advantage of the described aspects is that the aspects of the disclosure do not require coordination or negotiation between power sources other than simple broadcast by each power source or power controller, as explained. Furthermore, aspects of the disclosure are applicable to normal loads, overloads, and short circuits, or the like, and do not require any special modification or tailoring for any of these conditions during operations. In yet another advantage, aspects of the disclosure allow for or enable easy and automatic reconfiguration of output power from each power source when another power source is added or subtracted from the parallel system. Additionally, aspects of the disclosure can be applied to power distribution system having differently rated power sources or similarly rated power sources.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the described disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power controller for controlling a first power source, comprising:
    a power characteristic input and a communications connection; and
    a controller module adapted to:
        obtain a power characteristic at the power characteristic input, the power characteristic related to an available power capacity of the first power source coupled to a common power bus;
        obtain at least one power system message received at the communications connection indicative of whether a second power source is presently supplying power, the at least one power system message originating from another power controller associated with the second power source coupled to the common power bus;
        determine a present share of desired power to be supplied from the first power source to the common power bus based on the obtained power characteristic and the obtained at least one power system message; and
        operate the first power source in accordance with the determined present share of desired power to be supplied to the common power bus.

2. The power controller of claim 1 wherein the controller module is further adapted to generate a power system message at the communications connection.

3. The power controller of claim 2 wherein the generated power system message includes at least a power controller identification and the obtained power characteristic.

4. The power controller of claim 3 wherein the generated power system message further includes an operating status indicator.

5. The power controller of claim 2 wherein the controller module is further adapted to prevent message collisions between the generated power system message and the at least one power system message received at the communications connection.

6. The power controller of claim 1 wherein the controller module is further adapted to regulate the first power source in accordance with the determined present share of desired power.

7. The power controller of claim 1, further comprising a power converter adapted to convert power received from the first power source to another power supplied to the common power bus.

8. The power controller of claim 1 wherein the controller module is further adapted to determine a present share of desired current to be supplied from the first power source to the common power bus.

9. A method of allocating power in a power distribution system, comprising:
broadcasting, by a first power controller associated with a first power source, a generated message on a common communications bus indicative of the available power capacity of the first power source and a status indicator indicative of whether the first power source is presently supplying power;
obtaining, by a second power controller associated with a second power source, the generated message;
determining, by the second power controller, a present share of desired power to be supplied from the second power source based on the obtained generated message and the available power capacity of the second power source; and
operating the second power source in accordance with the determined present share of desired power to be supplied from the second power source to a common power bus connected with the first and second power source outputs.

10. The method of claim 9, further comprising:
independently broadcasting by a set of power controllers associated with a respective set of power sources, a set of generated messages on the common communications bus indicative of the respective power capacity of the respective set of power sources;
obtaining, the set of independently broadcasted messages, by the second power controller; and
determining, by the second power controller, a present share of desired power to be supplied from the second power source based on the obtained set of independently broadcasted messages and the power capacity of the second power source.

11. The method of claim 10 wherein determining a present share of desired power to be supplied includes calculating a desired current to be supplied equal to a ratio of the second power source to the total power capacity of the set of power sources multiplied by the total current demanded by the common power bus.

12. The method of claim 10, further comprising obtaining, by a third power controller associated with a third power source not suppling power to the common power bus, the set of independently generated messages on the common communications bus, and determining whether the set of power sources can meet a power demand for the power distribution system.

13. The method of claim 12, upon determining the set of power sources cannot meet the power demand, determining, by the third power controller, a present share of desired power to be supplied from the third power source based on the obtained generated message and the power capacity of the third power source, and operating the third power source in accordance with the determined present share of desired power to be supplied from the third power source to the common power bus.

14. The method of claim 13, wherein determining a present share of desired power to be supplied by at least one of the first, second, or third power sources to the common power bus is based on a prioritization of the set of power sources.

15. The method of claim 9, further comprising broadcasting, by the second power controller, another generated message on the common communications bus indicative of the power capacity of the second power source.

16. The method of claim 9, further comprising:
obtaining, by the first power controller, the another generated message by the second power controller;
determining, by the first power controller, a present share of desired power to be supplied from the first power source based on the another generated message and the power capacity of the first power source; and
operating the first power source in accordance with the determined present share of desired power to be supplied from the first power source to a common power bus connected with the first and second power source outputs.

17. The method of claim 9 wherein the generated message includes an operational status of the first power controller.

18. A power distribution system, comprising:
a set of power sources arranged electrically in parallel to a common power bus, the set of power sources including at least one generator and at least one supplemental power source;
a common communications bus; and
a set of power controllers respectively associated with the set of power sources; each of the set of power controllers including:
a power characteristic input and a communications connection to the common communications bus; and
a controller module adapted to:
obtain a power characteristic at the power characteristic input, the power characteristic related to a capacity of available power of the associated power source;
obtain at least one power system message received at the communications connection from another controller module;
determine a present share of desired power to be supplied from the associated power source to the common power bus based on the obtained power characteristic and the obtained at least one power system message and a prioritization of supplying power of the at least generator over of the at least one supplemental power source; and
operate the associated power source in accordance with the determined present share of desired power.

19. The power distribution system of claim 18 wherein each controller module is further adapted to generate a power system message at the communications connection.

20. The power distribution system of claim 18 wherein the generated power system message includes at least a power controller identification and the power characteristic of the associated power source.

\* \* \* \* \*